(12) United States Patent
Park (10) Patent No.: US 8,828,586 B2
(45) Date of Patent: Sep. 9, 2014

(54) RECHARGEABLE BATTERY PACK AND CONNECTION TAB USED FOR THE SAME

(75) Inventor: Sang-Hun Park, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 451 days.

(21) Appl. No.: 12/957,321

(22) Filed: Nov. 30, 2010

(65) Prior Publication Data

US 2011/0269011 A1 Nov. 3, 2011

Related U.S. Application Data

(60) Provisional application No. 61/330,795, filed on May 3, 2010.

(51) Int. Cl.
*H01M 2/20* (2006.01)

(52) U.S. Cl.
USPC ............ 429/158; 429/156; 429/157; 429/160

(58) Field of Classification Search
None
See application file for complete search history.

(56) References Cited

U.S. PATENT DOCUMENTS

| | | | |
|---|---|---|---|
| 2,983,899 A | 5/1961 | Amodio et al. | |
| 5,900,332 A | 5/1999 | Marukawa et al. | |
| 2008/0081252 A1* | 4/2008 | Miyazaki | 429/149 |
| 2008/0090136 A1 | 4/2008 | Kim et al. | |
| 2008/0096104 A1* | 4/2008 | Kim | 429/158 |
| 2008/0241647 A1 | 10/2008 | Fukui et al. | |
| 2010/0248007 A1 | 9/2010 | Kwon et al. | |
| 2010/0266891 A1 | 10/2010 | Kwon et al. | |

FOREIGN PATENT DOCUMENTS

| | | |
|---|---|---|
| EP | 1 202 359 A2 | 5/2002 |
| EP | 2048 723 A1 | 4/2009 |
| EP | 2 385 566 A1 | 11/2011 |
| JP | 10-106533 A | 4/1998 |
| JP | 2000-106164 A | 4/2000 |
| JP | 2000-138046 A | 5/2000 |
| JP | 2000-268793 A | 9/2000 |
| JP | 2000-357502 | 12/2000 |
| JP | 2001 035473 A | 2/2001 |
| JP | 2003-77453 | 3/2003 |
| JP | 2010-528447 | 8/2010 |
| JP | 2010-533953 | 10/2010 |
| KR | 10-2008-0088356 A | 10/2008 |

(Continued)

OTHER PUBLICATIONS

Korean Patent Abstracts for Korean Publication 1020090037773, dated Apr. 16, 2009, corresponding to Korean Patent 10-0965274.

(Continued)

*Primary Examiner* — Ula C Ruddock
*Assistant Examiner* — Tony Chuo
(74) *Attorney, Agent, or Firm* — Christie, Parker & Hale, LLP (57) ABSTRACT

There are provided a rechargeable battery pack, which, upon connecting a plurality of rechargeable battery cells, forms a strong binding force between the cells and reduces the volume of the cells, and a connection tab used for the same. A rechargeable battery pack comprises: a first unit cell and a second unit cell connected in series/parallel to form a core pack and formed as a rechargeable battery; and a connection tab connected to the case of the first unit cell to protrude to the opposite side of the case, coupled to a cap plate protruding from the second unit cell toward the first unit cell, and connected to a protection circuit.

19 Claims, 12 Drawing Sheets

(56) References Cited

FOREIGN PATENT DOCUMENTS

| | | |
|---|---|---|
| KR | 10-2009-0008079 A | 1/2009 |
| KR | 10-0965274 B1 | 6/2010 |
| WO | WO 2009/011539 A2 | 1/2009 |
| WO | WO 2009/011540 A2 | 1/2009 |

OTHER PUBLICATIONS

Patent Abstracts of Japan and English language machine translation of JP 2000-357502, 10 shts.
Patent Abstracts of Japan and English language machine translation of JP 2003-077453, 11 shts.
Extended European Search Report dated Jun. 29, 2011 in corresponding application No. 11250278.6, 6 shts.
Patent Abstracts of Japan and English Machine Translation of JP 2000-106164 A, 13 pages.
Patent Abstracts of Japan and English Machine Translation of JP 2000-138046 A, 8 pages.
Patent Abstracts of Japan and English Machine Translation of JP 2000-268793 A, 6 pages.
SIPO Office action dated May 29, 2013, with English translation, corresponding to Chinese Patent application 201110112183.2, (18 pages).
EPO Office action dated Jun. 12, 2014, for corresponding European Patent application 11250278.6, (4 pages).

* cited by examiner

RECHARGEABLE BATTERY PACK AND CONNECTION TAB USED FOR THE SAME

CROSS-REFERENCE TO RELATED APPLICATION

This application claims priority to and the benefit of U.S. Provisional Patent Application No. 61/330,795, filed on May 3, 2010 in the United States Patent and Trademark Office, the entire content of which is incorporated herein by reference.

BACKGROUND

1. Field

Aspects of embodiments of the present invention relate to a rechargeable battery pack including a plurality of rechargeable battery cells, and a connection tab used for the same.

2. Description of the Related Art

Technological development and increased demand for mobile equipment have led to a rapid increase in the demand for rechargeable batteries as an energy source. The rechargeable batteries can be used in the form of a single cell or in the form of a pack having a plurality of cells electrically connected according to the type of equipment used.

In general, cylindrical rechargeable batteries have higher capacity than prismatic rechargeable batteries or pouch-type rechargeable batteries, and are connected in series or parallel to form a rechargeable battery pack having a linear or plate structure. A rechargeable battery pack includes a core pack having a plurality of cylindrical rechargeable battery cells connected in series or in parallel and a connection tab for electrically connecting a positive terminal and a negative terminal to a protection circuit in the core pack state.

For instance, a core pack having a serial structure is formed by welding different electrodes of rechargeable battery cells to one surface of the connection tab and then bending the connection tab. Also, a core pack having a parallel structure is formed by welding the same electrodes of rechargeable battery cells to one surface of the connection tab and then bending the connection tab. That is, linearly disposed rechargeable battery cells are electrically connected through the bent portion of the connection tab. Accordingly, the binding force, straightforwardness, and impact resistance of the rechargeable battery cells are weak in a typical core pack.

The above information disclosed in this Background section is only for enhancement of understanding of the background of the invention and therefore it may contain information that does not form the prior art that is already known in this country to a person of ordinary skill in the art.

SUMMARY

According to an aspect of embodiments of the present invention, a rechargeable battery pack includes a connection tab for connecting a plurality of rechargeable battery cells, the connection tab forming a strong binding force between the cells and reducing the volume of the cells.

According to an embodiment of the present invention, a rechargeable battery pack includes: a first unit cell including a first end and a second end opposite the first end; a second unit cell including a first end and a second end opposite the first end, the second unit cell being coupled to the first unit cell in an axial direction extending between the first ends; and a connection tab coupled to the first end of the first unit cell and the second end of the second unit cell and electrically connecting the first and second unit cells to each other in series or parallel, the connection tab including a protrusion extending away from the first end of the first unit cell; and a guide portion extending from the protrusion in a circumferential direction relative to the axial direction.

In one embodiment, the connection tab is attached to a case of the first unit cell at the first end of the first unit cell. In one embodiment, the second unit cell includes a cap plate including a protruded portion extending away from the second end of the second unit cell and an opening adjacent the protruded portion, and the guide portion is rotatably inserted in the opening in the circumferential direction, an outer surface of the guide portion being adjacent an inner surface of the protruded portion and constraining movement of the second unit cell relative to the first unit cell in the axial direction. The connection tab may further include a flange and a stop protruding from the flange.

In one embodiment, the stop is adjacent the protruded portion of the cap plate of the second unit cell and constrains movement of the second unit cell relative to the first unit cell in the circumferential direction. In one embodiment, the protrusion is a first protrusion, the guide portion is a first guide portion, and the connection tab further includes a second protrusion extending away from the first end of the first unit cell and a second guide portion extending from the second protrusion in the circumferential direction, the first and second protrusions being spaced apart from one another in the circumferential direction, and the first and second guide portions being spaced apart from one another in the circumferential direction. The cap plate may have another opening adjacent the protruded portion at a side of the protruded portion opposite the opening, and a distance between the first guide portion and the second protrusion in the circumferential direction may be greater than a width of the protruded portion between the openings.

In one embodiment, the stop is between the first guide portion and the second protrusion in the circumferential direction and is elastically deformable by the protruded portion of the cap plate of the second unit cell. The protruded portion may be insertable between the first guide portion and the second protrusion.

In one embodiment, the connection tab further includes an elastic member pushing the protruded portion of the cap plate of the second unit cell against the guide portion. In one embodiment, the stop includes a protuberance extending in a direction opposite the circumferential direction and covering a portion of the protruded portion of the cap plate of the second unit cell. The flange may have a perimeter shape substantially corresponding to a perimeter shape of the case of the first unit cell at the first end of the first unit cell. The connection tab may be welded to the case of the first unit cell at the first end of the first unit cell.

In one embodiment, the connection tab further includes a flange coupled to the first end of the first unit cell, and the protrusion protrudes from the flange. The guide portion may include an inclined surface facing the flange and being inclined away from the flange in the circumferential direction.

In one embodiment, the connection tab further includes a tab protruding from a side of the connection tab and coupled to a protection circuit. In one embodiment, the connection tab further includes another tab protruding from another side of the connection tab. The tab may include a rim portion extending around a perimeter portion of the first unit cell adjacent the first end of the first unit cell.

The connection tab may include at least one material selected from the group consisting of nickel, nickel alloys, stainless steel, zinc, zinc alloys, copper, copper alloys, silver, silver alloys, gold, gold alloys, platinum, platinum alloys, aluminum, aluminum alloys, molybdenum, molybdenum alloys, tungsten, tungsten alloys, titanium, titanium alloys, beryllium, beryllium alloys, rhodium, and rhodium alloys.

According to another embodiment of the present invention, a rechargeable battery pack includes a first unit cell and a second unit cell connected in series or parallel to form a core pack and formed as a rechargeable battery; and a connection tab connected to a case of the first unit cell to protrude to the opposite side of the case, coupled to a cap plate protruding from the second unit cell toward the first unit cell, and connected to a protection circuit.

According to another embodiment of the present invention, a connection tab of a rechargeable battery pack includes a flange formed as a doughnut-shaped ring corresponding to the outer periphery of the flat surface of the case and electrically connected to the case; protrusions protruding to the opposite side of the case from the flange; guides formed with a given length along the circumferential direction of the flange; stoppers protruding from the flange at one side of the protrusions; and a pull tab connected to the flange and connected to a protection circuit.

According to another aspect of embodiments of the present invention, first and second unit cells may be connected forming a rechargeable battery pack with a strong binding force and having a reduced volume of the rechargeable battery pack by connecting a connection tab to a case of the first unit cell and coupling the connection tab to a cap plate of the second unit cell.

BRIEF DESCRIPTION OF THE DRAWINGS

The above and other features and advantages will become more apparent to those of ordinary skill in the art by describing in detail some exemplary embodiments of the present invention with reference to the attached drawings. Moreover, additional aspects and/or advantages of embodiments of the present invention are set forth in the following description and accompanying drawings, or may be obvious in view thereof to those skilled in the art.

| Description of Reference Numerals Indicating Some Elements in the Drawings | |
|---|---|
| 4, 5: first and second unit cells | 6, 26, 36, 46, 56, 66: connection tab |
| 10: electrode array | 11,13: first and second electrodes |
| 11a, 13a: first and second coated sections | |
| 11b, 13b: first and second uncoated sections | |
| 11d, 13d: first and second current collector plates | |
| 12: separator | 14: sector pin |
| 20: case | 21: beading unit |
| 22: clamping unit | 30: cap assembly |
| 31: cap plate | 31a, 62: first and second protrusions |
| 31b: exhaust port | 32: vent plate |
| 32a: vent | 32b: notch |
| 33: insulating plate | 34: sub-plate |
| 35: positive coefficient temperature element | |
| 37: connecting member | 38: middle plate |
| 61: flange | 63, 263: guide |
| 64, 464: stopper | 65, 665: pull tab |
| 100, 200, 300, 400: rechargeable battery pack | |
| 264: inclined surface | 366: elastic member |
| 465: protuberance | 666: rim |
| C: gap | L: length |
| S: space | |

DETAILED DESCRIPTION

Some exemplary embodiments will now be described more fully hereinafter with reference to the accompanying drawings; however, embodiments of the present invention may be embodied in different forms and should not be construed as limited to the exemplary embodiments illustrated and set forth herein. Rather, these exemplary embodiments are provided by way of example for understanding of the invention and to convey the scope of the invention to those skilled in the art. As those skilled in the art would realize, the described embodiments may be modified in various different ways, all without departing from the spirit or scope of the present invention. Like reference numerals designate like elements throughout the specification and drawings.

Figure 1:
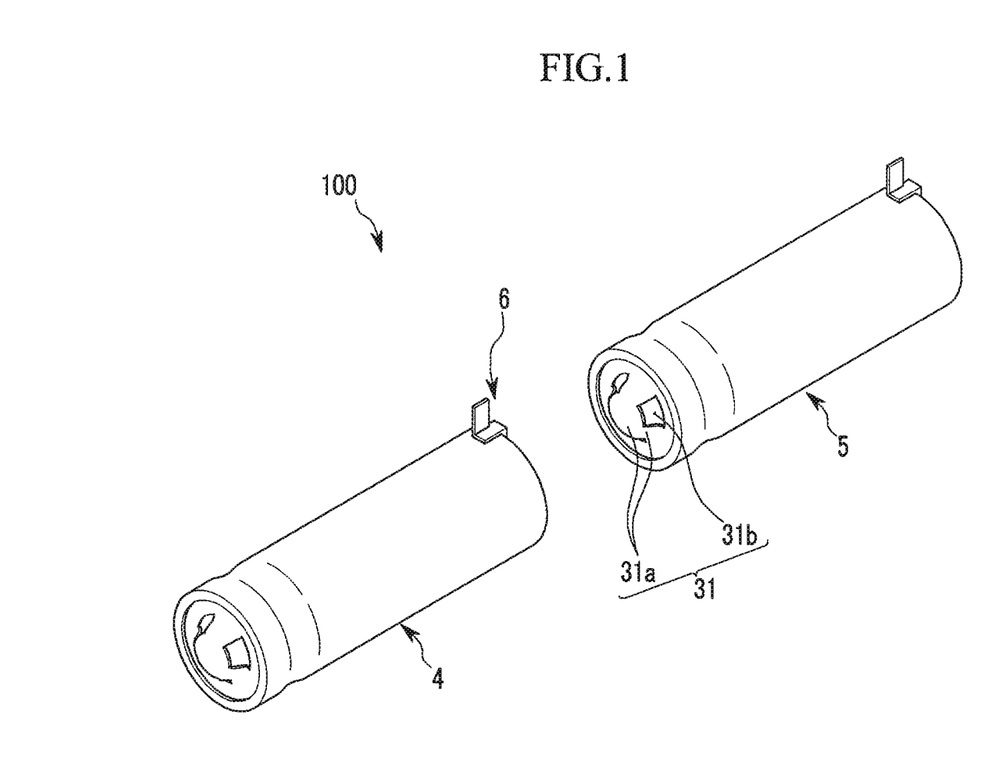
FIG. 1 is an exploded perspective view of a rechargeable battery pack according to an exemplary embodiment of the present invention.

FIG. 1 is an exploded perspective view of a rechargeable battery pack 100 according to an exemplary embodiment of the present invention. The rechargeable battery pack 100 comprises at least a first unit cell 4 and a second unit cell 5 connected in series or parallel to form a core pack and formed as a rechargeable battery, and a connection tab 6 for connecting electrode terminals of the first and second unit cells 4 and 5 to a protection circuit (not shown).

For convenience of explanation, the rechargeable battery pack 100 will be described and shown herein connecting the first and second unit cells 4 and 5 in series, by way of example. Applying the connection tab 6, as compared to parallel connection of the first and second unit cells 4 and 5, serial connection of the first and second unit cells 4 and 5 has the advantage that a cylindrical rechargeable battery (see FIG. 2) having a flat negative terminal (e.g., a case 20 having a flat surface) and a protruding positive terminal (e.g., a cap plate 31 having protrusions) can be connected as configured.

In one embodiment, the flat surface of the case 20 is used as the negative terminal of the serial connection of the first and second unit cells 4 and 5, the connection tab 6 has a shape of a protruding structure and is connected to the flat surface of the case 20, and the positive terminal is formed of the cap plate 31 protruding to the opposite side of the connection tab 6 connected to the flat surface of the case 20.

That is, in one embodiment, the first and second unit cells 4 and 5 are formed having a same structure. The first and second unit cells 4 and 5 allow the positive terminal and the negative terminal to be coupled to each other through a protruding structure coupled thereto. As such, in one embodiment, the first and second unit cells 4 and 5 are connected in series by coupling the cap plate 31 serving as the positive terminal of the second unit cell 5 to the connection tab 6 connected to the flat surface of the case 20 serving as the negative terminal of the first unit cell 4.

Figure 2:
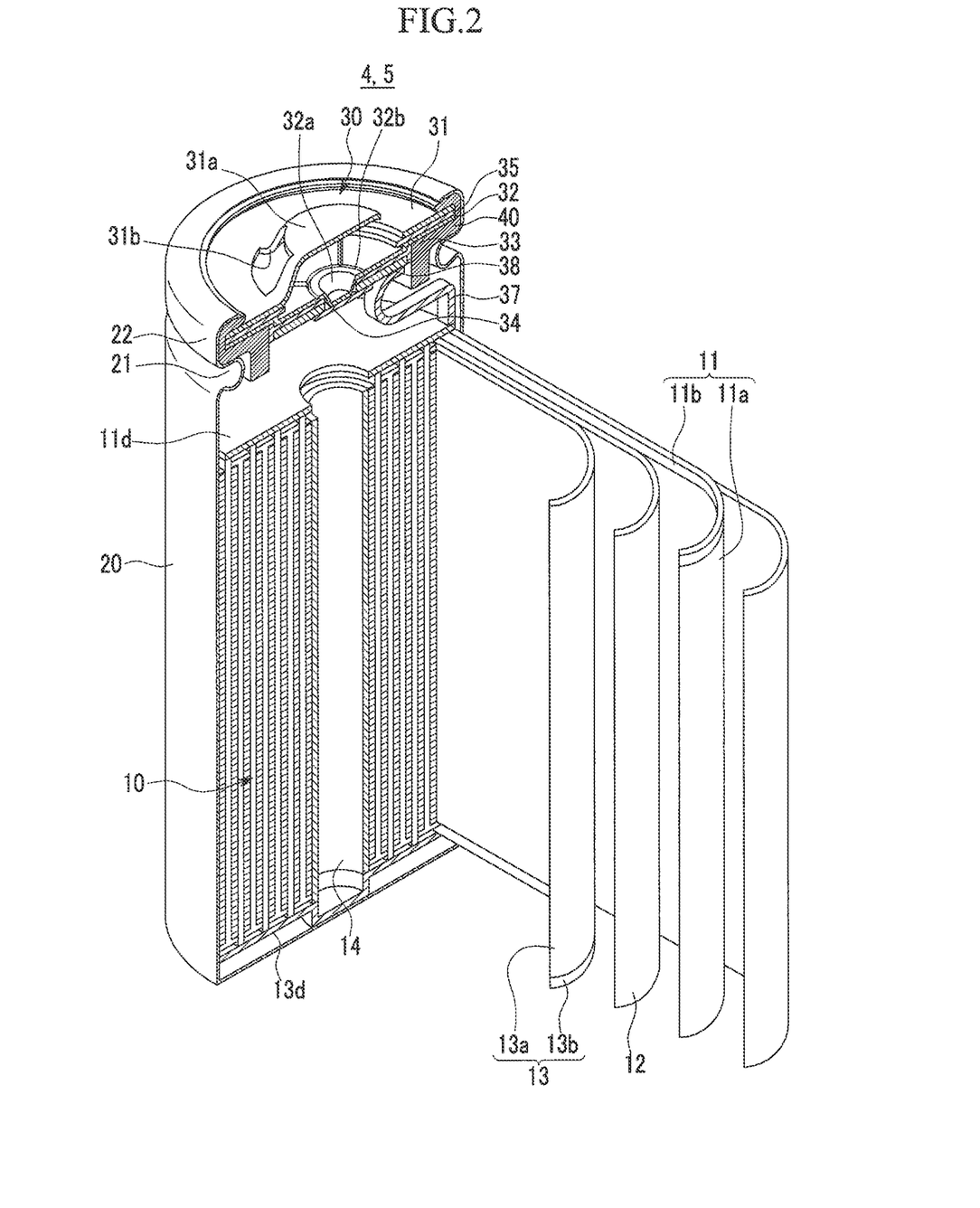
FIG. 2 is a cross-sectional view of a rechargeable battery of the rechargeable battery pack of FIG. 1.

FIG. 2 is a cross-sectional view of a rechargeable battery applied to the rechargeable battery pack of FIG. 1. Referring to FIG. 2, the rechargeable battery forming the first and second unit cells 4 and 5 used for serial connection will be described. The first and second unit cells 4 and 5 each include an electrode array 10 for generating current, a case 20 for containing the electrode array 10, and a cap assembly 30 electrically connected to the electrode array 10 through the case 20.

The electrode array 10, in one embodiment, includes a first electrode 11 (e.g., a positive electrode), a separator 12, and a second electrode 13 (e.g., a negative electrode) that are sequentially layered. The electrode array 10 may be formed by spirally winding the first electrode 11, the second electrode 13, and the separator 12, which is an insulator interposed between the first and second electrodes 11 and 13. In one embodiment, the electrode array 10 has a generally cylindrical shape. A sector pin 14 may be disposed at the center of the cylindrical electrode array 10 for maintaining the cylindrical shape of the electrode array 10.

The first electrode 11 and the second electrode 13, in one embodiment, include current collectors formed of thin metal foils, coated sections 11a and 13a coated with an active material on both sides of the current collectors, and uncoated sections 11b and 13b located at opposite ends of the current collectors and which do not have an active material coated thereon. In one embodiment, in a jelly roll state, a first current collector plate 11d (e.g., a positive current collector plate) is connected to the uncoated section 11 b of the first electrode 11, and a second current collector plate 13d (e.g., a negative current collector plate) is connected to the uncoated section 13b of the second electrode 13.

The case 20, in one embodiment, has a generally cylindrical shape with one side open to allow for insertion of the electrode array 10. In one embodiment, the case 20 is connected to the second current collector plate 13d to operate as a terminal (e.g., a negative terminal) of the first and second unit cells 4 and 5. The case 20 may be formed of a conductive metal, for example, such as aluminum, an aluminum alloy, or nickel-plated steel.

In one embodiment, the cap assembly 30 is connected to the open side of the case 20 with a gasket 40 interposed between the cap assembly 30 and the case 20, thereby sealing the case 20 containing the electrode array 10 and an electrolyte therein. The cap assembly 30, in one embodiment, includes a current interruption device and is electrically connected to the electrode array 10 through the current interruption device. The cap assembly 30, in one embodiment, includes the cap plate 31, a vent plate 32, an insulation plate 33, a sub-plate 34, a positive temperature coefficient element 35, and a middle plate 38.

In one embodiment, the cap plate 31 is connected to the first current collector plate 11d, and operates as a terminal (e.g., a positive terminal) of the first and second unit cells 4 and 5. The cap plate 31, in one embodiment, includes first protrusions 31a protruding outward from the case 20 and one or more exhaust ports 31b open laterally from the first protrusions 31a.

In one embodiment, the current interruption device is formed of the vent plate 32 and the sub-plate 34, and the connection of the current interruption device is formed by a welded portion of the vent plate 32 and the sub-plate 34. The vent plate 32 formed at one end of the current interruption device is disposed on the interior of the cap plate 31, thereby being electrically connectable to the sub-plate 34 that forms the other end of the current interruption device. Also, the vent plate 32, in one embodiment, includes a vent 32a that can be fractured at a preset pressure to allow the discharge of internal gas of the first and second unit cells 4 and 5 and interrupt an electrical connection to the sub-plate 34.

When the current interruption device operates, that is, when the connection of the vent plate 32 and the sub-plate 34 is separated, the electrode array 10 is electrically disconnected from the cap plate 31. In one embodiment, the vent 32a protrudes from the vent plate 32 toward an interior of the case 20. In one embodiment, the vent plate 32 includes a notch 32b around the vent 32a for guiding fracture of the vent 32a, and the notch 32b prevents or substantially prevents explosion of the rechargeable battery by fracturing and discharging gas if pressure is increased by gas generated in the case 20.

The positive temperature coefficient element 35, in one embodiment, is disposed between the cap plate 31 and the vent plate 32 and controls current flow between the cap plate 31 and the vent plate 32. The positive temperature coefficient element 35 has electrical resistance that infinitely increases when it exceeds a preset temperature, therefore, allowing it to interrupt charge or discharge current flow.

The sub-plate 34, in one embodiment, faces the vent plate 32 with the insulating plate 33 interposed therebetween, and is electrically connected to the vent 32a. The middle plate 38 is disposed between the insulating plate 33 and the sub-plate 34. The vent 32a protruding through penetration holes is connected to the sub-plate 34. Therefore, in one embodiment, one side of the middle plate 38 is electrically connected to the vent plate 32 through the sub-plate 34 and the vent 32a, and another side of the middle plate 38 is connected to the first current collector plate 11d through a connecting member 37. As a result, in one embodiment, the first current collector plate lid is electrically connected to the cap plate 31 through the connecting member 37, the middle plate 38, the sub-plate 34, the vent 32a, the vent plate 32, and the positive temperature coefficient element 35.

The cap assembly 30, in one embodiment, is inserted into the case 20 and then fixed to the case 20 by clamping for forming the first and second unit cells 4 and 5. In one embodiment, a beading unit 21 and a clamping unit 22 are formed, as shown in FIG. 2.

Figure 3:
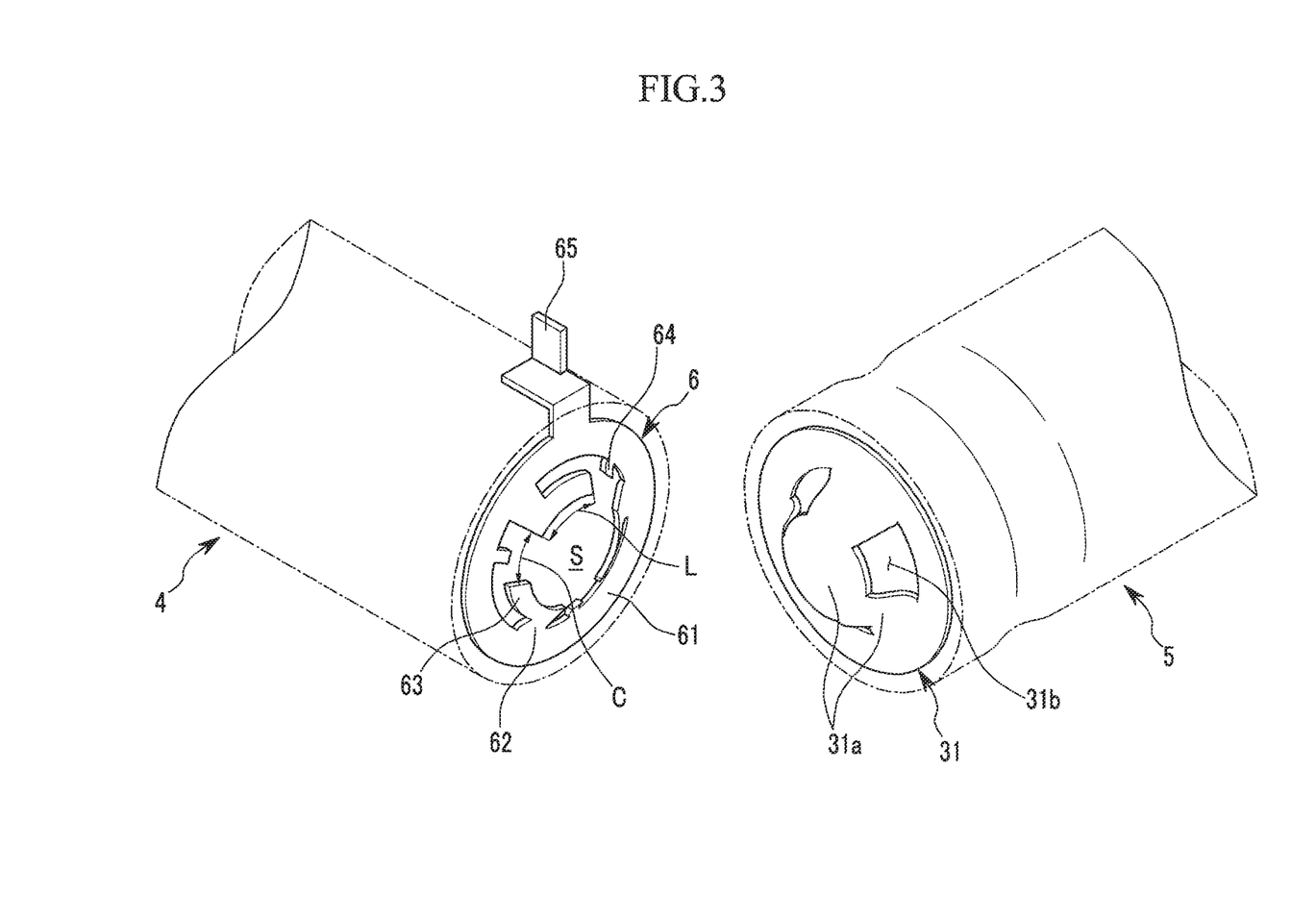
FIG. 3 is an exploded perspective view of a connection tab and a cap plate of the rechargeable battery pack of FIG. 1, shown in an uncoupled state.

FIG. 3 is an exploded perspective view of the connection tab 6 and the cap plate 31 shown in an uncoupled state, or separated from each other, that are applied to the rechargeable battery pack 100 of FIG. 1. Referring to FIGS. 1 and 3, in one embodiment, the connection tab 6 is connected to the flat surface of the case 20 of the first unit cell 4 and protrudes away from the flat surface of the case 20 (i.e. toward the second unit cell 5), and is coupled to the cap plate 31 protruding away from the second unit cell 5 (i.e. toward the first unit cell 4). That is, the connection tab 6 and the cap plate 31 are formed such that they protrude toward each other so as to be coupled to each other.

For instance, in one embodiment, the first protrusions 31a of the cap plate 31 of the second unit cell 5 protrude outward from the center of the cap plate 31, and the exhaust ports 31b are disposed at substantially equal intervals on the cap plate 31 along side the first protrusions 31a. In one embodiment, three exhaust ports 31b are formed at substantially equal intervals for forming a stable connection structure with the connection tab 6. However, the number of the exhaust ports 31b is not limited to three and, in other embodiments, may be one, two, or any other suitable number, and, accordingly, the protrusion structure of the connection tab 6 may be modified depending on the number of the exhaust ports 31b.

The connection tab 6, in one embodiment, is welded to the flat surface of the case 20 of the first unit cell 4. In one embodiment, the connection tab 6 includes a flange 61 formed as a doughnut-shaped ring corresponding to the circular outer periphery of the flat surface of the case 20 and electrically connected to the case 20, one or more second protrusions 62 disposed at substantially equal intervals on the flange 61 and protruding away from the case 20, one or more guides 63 formed with a length L along the circumferential direction of the flange 61, one or more stoppers 64, or stops, protruding from the flange 61 at one side of the second protrusions 62, and a pull tab 65 connected to the flange 61 and connected to a protection circuit (not shown).

In one embodiment, the flange 61 forms an electrical connection structure on the case 20 by being welded to the case 20. The flange 61, in one embodiment, forms the base of the connection tab 6 and connects the case 20 and the cap plate 31 to the protection circuit through the pull tab 65 connected at a diameter-direction outer end to pull current of the first and second unit cells 4 and 5 to the protection circuit.

The second protrusions 62, in one embodiment, are formed to protrude from inner ends of the flange 61 in an inward radial direction and are inclined toward the center of the flange 61. As such, in one embodiment, with respect to a length of the circumference along the circumferential direction, the plurality of protrusions 62 become shorter in length than the portion connected to the flange 61 as they become distant from the flange 61.

The guides 63, in one embodiment, are formed in a curved, or arcuate shape, along one side of the circumferential direction at an end of the second protrusions 62. The guides 63 are not connected to each other as they extend in one direction (e.g., clockwise) from respective ones of the second protrusions 62. Thus, a circumferential gap C is provided between the second protrusion 62 and the guide 63 neighboring to the second protrusion, and the second protrusions 62 and the guides 63 are not formed in the gap C. In one embodiment, the plurality of guides 63 forms a space S at a central region between the guides 63. The first protrusions 31a of the cap plate 31 are inserted in the length direction (i.e. the axial direction) of the first and second unit cells 4 and 5 through the space S. At this point, a side portion of the protrusion 31a is inserted into the gap C. In one embodiment, a circumferential length of each of the protrusions 31a is shorter than a length of the gap C.

The stoppers 64, in one embodiment, are formed at portions of the flange 61 corresponding to the gaps C. The stoppers 64 enable axial and rotatable insertion of the first protrusions 31a of the cap plate 31 with respect to the second protrusions 62 and the guides 63, and stop the separation of the first protrusions 31a from the second protrusions 62 and the guides 63 by preventing or substantially preventing reverse rotation of the first protrusions 31a relative to the second protrusions 62 after the axial and rotatable insertion.

In one embodiment, the stopper 64 is formed of an elastic material and protrudes from an inner portion of the flange 61. In one embodiment, the connection tab 6 including the stopper 64 is formed entirely of an elastic material. For example, the connection tab 6 may be formed of nickel, a nickel alloy, stainless steel, zinc, a zinc alloy, copper, a copper alloy, silver, a silver alloy, gold, a gold alloy, platinum, a platinum alloy, aluminum, an aluminum alloy, molybdenum, a molybdenum alloy, tungsten, a tungsten alloy, titanium, a titanium alloy, beryllium, a beryllium alloy, rhodium, or a rhodium alloy. Alternatively, the connection tab 6 may be formed of any other suitable elastic material. In one embodiment, the stopper 64 may be formed in one of the gaps C provided along the circumferential direction of the flange 61, but in other embodiments, the stopper 64 may be formed at some or all of the gaps C as shown in FIG. 3 for more effectively preventing the first protrusions 31a of the cap plate 31 from rotating in the reverse direction relative to the second protrusions 62 and the guides 63.

Figure 4:
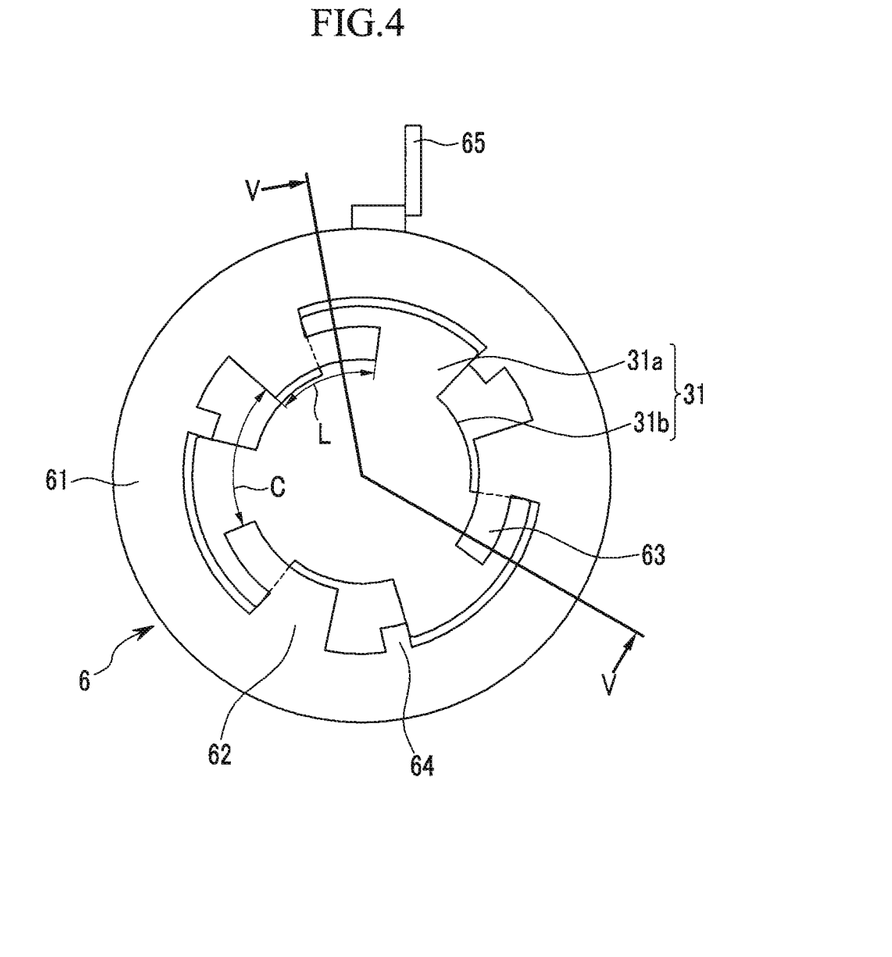
FIG. 4 is a side view of protrusions of the cap plate shown coupled to the connection tab of FIG. 3.
Figure 5:
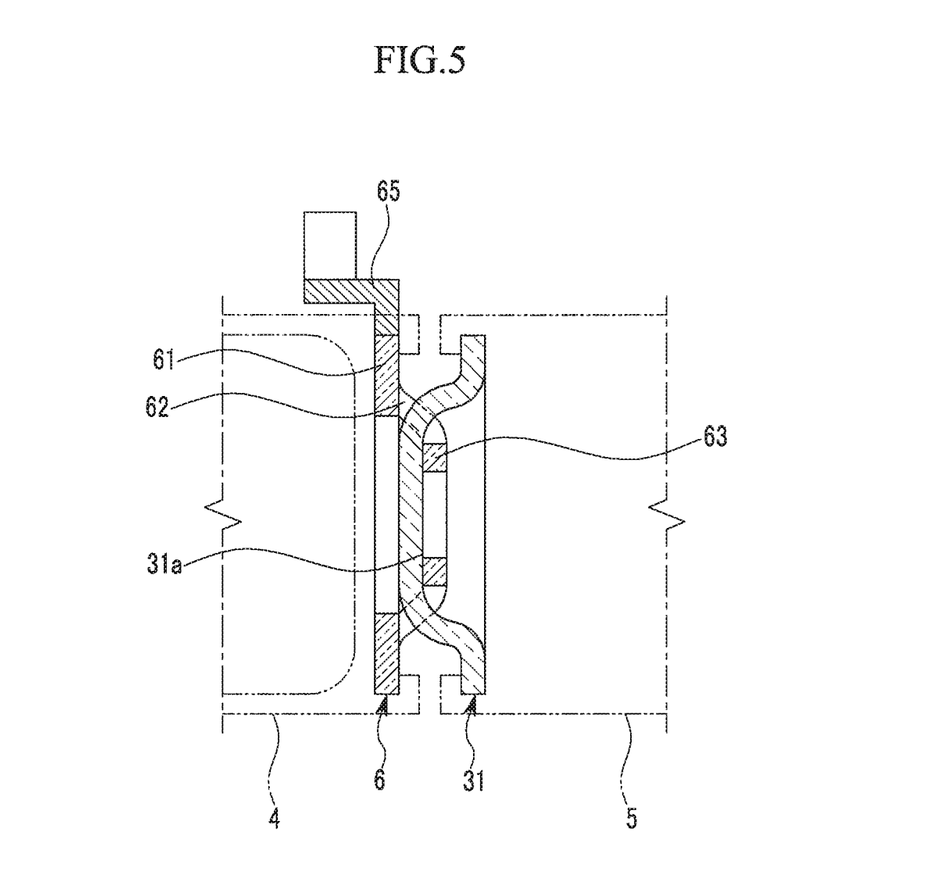
FIG. 5 is a cross-sectional view of the cap plate and the connection tab of FIG. 4 taken along line V-V.

FIG. 4 is a side view of protrusions of the cap plate being coupled to the connection tab of FIG. 3, and FIG. 5 is a cross-sectional view taken along line V-V.

With reference to FIGS. 4 and 5, the coupling of the first and second unit cells 4 and 5 is described further below.

Upon coupling the first and second unit cells 4 and 5, the first protrusions 31a of the cap plate 31 are inserted in the axial direction of the first and second unit cells 4 and 5 through the space S and gaps C formed on the connection tab 6. Upon completion of the axial insertion, the front ends of the first protrusions 31a of the cap plate 31 exert pressure against and elastically deform the stoppers 64 (as indicated by the two-dot chain line of FIG. 6).

After completion of the axial insertion, as the first unit cell 4 is fixed and the second unit cell 5 is rotated (e.g., counter-clockwise), the first protrusions 31a of the cap plate 31 are rotated, whereby the guides 63 are inserted in respective ones of the exhaust ports 31b and thereby coupled to the cap plate 31. Also, as the second unit cell 5 is fixed and the first unit cell 4 is rotated (e.g., clockwise), the guides 63 are rotated and inserted into the exhaust ports 31b and thereby coupled to the cap plate 31. At this point, end surface portions of the first protrusions 31a are tightly contacted to the inner end of the flange 61, and the guides 63 on the inside of the exhaust ports 31b are tightly contacted to inner surface portions of the first protrusions 31a and thus electrically connected thereto.

Figure 6:
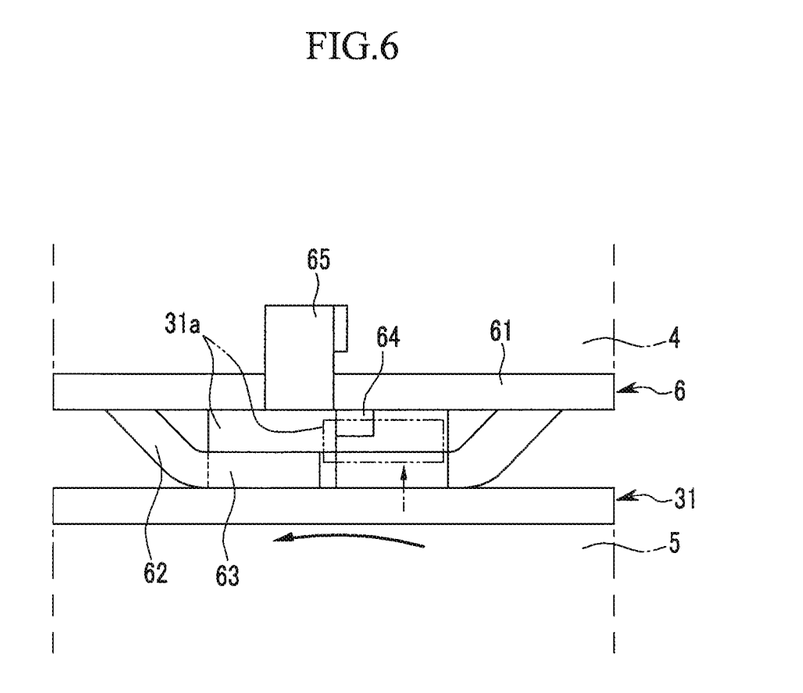
FIG. 6 is a top view of protrusions of the cap plate shown coupled to the connection tab of FIG. 3.

FIG. 6 is a top view of the protrusions 31a of the cap plate 31 being coupled to the connection tab 6 of FIG. 3. Referring to FIG. 6, when inserted in the axial direction of the first and second unit cells 4 and 5, the first protrusion 31a of the cap plate 31 exerts pressure on and elastically deforms the stopper 64 (as indicated by the two-dot chain line), and when the first protrusion 31a is released from the stopper 64 by rotatable insertion, the stopper 64 is restored by its elasticity and maintained in a protruding position at one side of the first protrusion 31a of the cap plate 31. That is, the stopper 64 is maintained in a rotatably inserted position by preventing or substantially preventing reverse rotation of the first protrusion 31a of the cap plate 31 relative to the guide 63. At this point, in one embodiment, a side surface of the stopper 64 is tightly contacted against a side surface of the protrusion 31a. As a result, the axially connected state between the guide 63 and the exhaust port 31b is firmly maintained.

Various other exemplary embodiments of the present invention will be described below. A description of same or substantially similar components as those of the above-described exemplary embodiment will be omitted, and only components and features different from those of the rechargeable battery pack 100 described above will be described.

Figure 7:
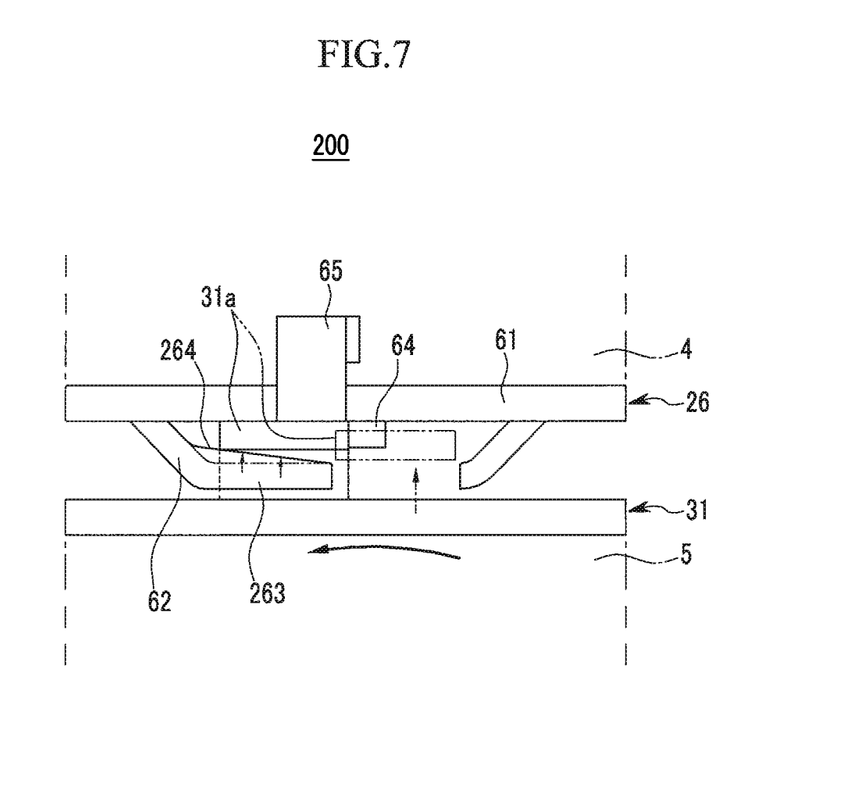
FIG. 7 is a top view of a connection tab and a cap plate of a rechargeable battery pack according to another exemplary embodiment of the present invention, shown in a coupled state.

FIG. 7 is a top view of a connection tab 26 and the cap plate 31 of a rechargeable battery pack 200 according to another exemplary embodiment of the present invention, shown in a coupled state. Whereas, in one embodiment, an inner surface of the guide 63 of the connection tab 6 of the rechargeable battery pack 100 is formed as a flat surface, referring to FIG. 7, the connection tab 26 of the rechargeable battery pack 200 includes a guide 263 having an inner surface formed as an inclined surface 264.

In one embodiment, an outer surface of the guide 263 is formed substantially parallel with an outer surface of the flange 61, and the inner surface of the guide 263, (i.e. the inclined surface 264) becomes closer to the flange 61 in a direction approaching the second protrusion 62 and becomes gradually more distant from the flange 61 in a direction moving farther away from the second protrusion 62.

After completion of the axial insertion of the second unit cell 5 with respect to the first unit cell 4, as the first unit cell 4 is fixed and the second unit cell 5 is rotated (e.g., counter-clockwise), the guides 263 are inserted in respective ones of the exhaust ports 31b and are thereby coupled to the cap plate 31. Also, as the second unit cell 5 is fixed and the first unit cell 4 is rotated (e.g., clockwise), the guides 263 are rotated and inserted in respective ones of the exhaust ports 31b and are thereby coupled to the cap plate 31.

At this point, the inclined surfaces 264 of the guides 263 push the first protrusions 31a of the cap plate 31 to the flange 61 as the rotation proceeds further. Therefore, the first protrusions 31a can be tightly contacted against the flange 61, and, in one embodiment, the first protrusions 31a are smaller than the circumference formed on the inner edge of the flange 61, and the first protrusions 31a are contacted with the case 20 over a wide area by a larger angle of incline of the inclined surface 264, thereby forming an electrical connection structure having a low resistance.

Figure 8:
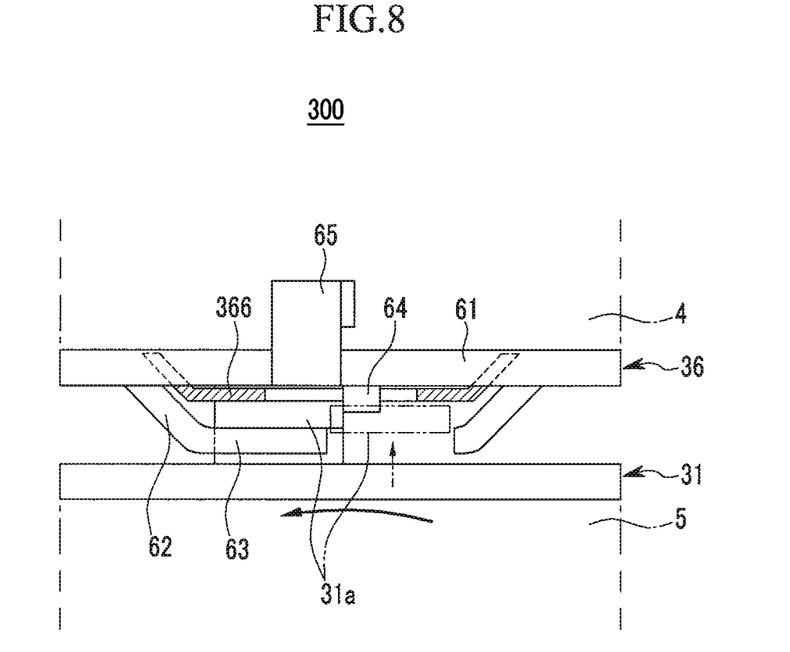
FIG. 8 is a top view of a connection tab and a cap plate of a rechargeable battery pack according to another exemplary embodiment of the present invention, shown in a coupled state.
Figure 9:
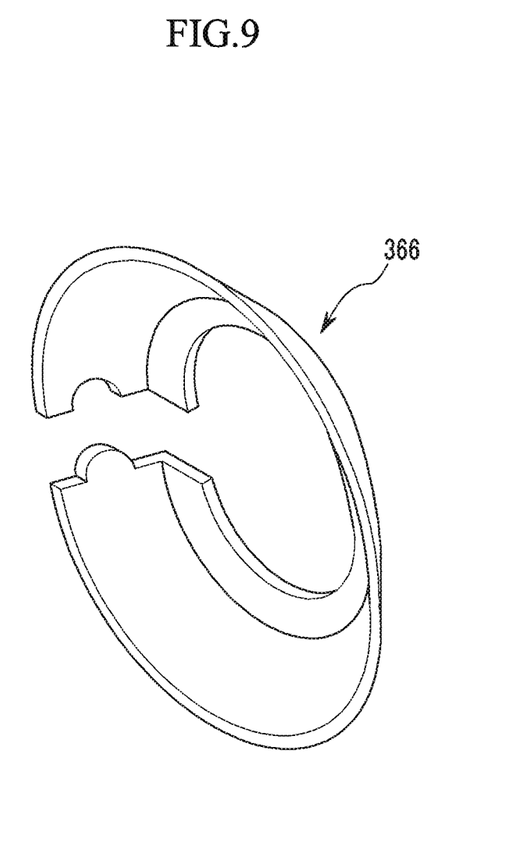
FIG. 9 is a perspective view of an elastic member of the rechargeable battery pack of FIG. 8.

FIG. 8 is a top view of a connection tab 36 and the cap plate 31 of a rechargeable battery pack 300 according to another exemplary embodiment of the present invention, shown in a coupled state, and FIG. 9 is a perspective view of an elastic member 366 applied to the rechargeable battery pack 300. Whereas, in one embodiment, the connection tab 6 of the rechargeable battery pack 100 forms a structure directly connecting the first protrusion 31a of the cap plate 31 to the flange 61 or the case 20, referring to FIGS. 8 and 9, the connection tab 36 of the rechargeable battery pack 300 further includes the elastic member 366 interposed between the first protrusion 31a and the case 20.

In one embodiment, the elastic member 366 has a cutout structure formed by cutting a frustum of a cone open, and has elasticity in an axial direction while being movable in a diameter direction. Upon completion of the axial insertion of the second unit cell 5 with respect to the first unit cell 4, the front ends of the first protrusions 31a of the cap plate 31 exert pressure on the stoppers 64 and the elastic member 366.

After completion of the axial insertion, as the first unit cell 4 is fixed and the second unit cell 5 is rotated (e.g., counter-clockwise), the guides 63 are inserted in respective ones of the exhaust ports 31b and are thereby coupled to the cap plate 31. Also, as the second unit cell 5 is fixed and the first unit cell 4 is rotated (e.g., clockwise), the guides 63 are rotated and inserted in respective ones of the exhaust ports 31b and are thereby coupled to the cap plate 31.

At this point, the elastic member 366 pushes against the first protrusions 31a of the cap plate 31 while providing elasticity in the axial direction, thereby tightly contacting and electrically connecting end surface portions of the first protrusions 31a of the cap plate 31 to the inner surfaces of the guides 63. The first protrusions 31a and the guides 63, in one embodiment, contact each other over a wide area, thereby forming an electrical connection structure having a low resistance. In one embodiment, the elastic member 366 is formed of a conductive material, and the elastic member 366 can form a low resistance structure by further electrically connecting the case 20 and the first protrusions 31a.

Figure 10:
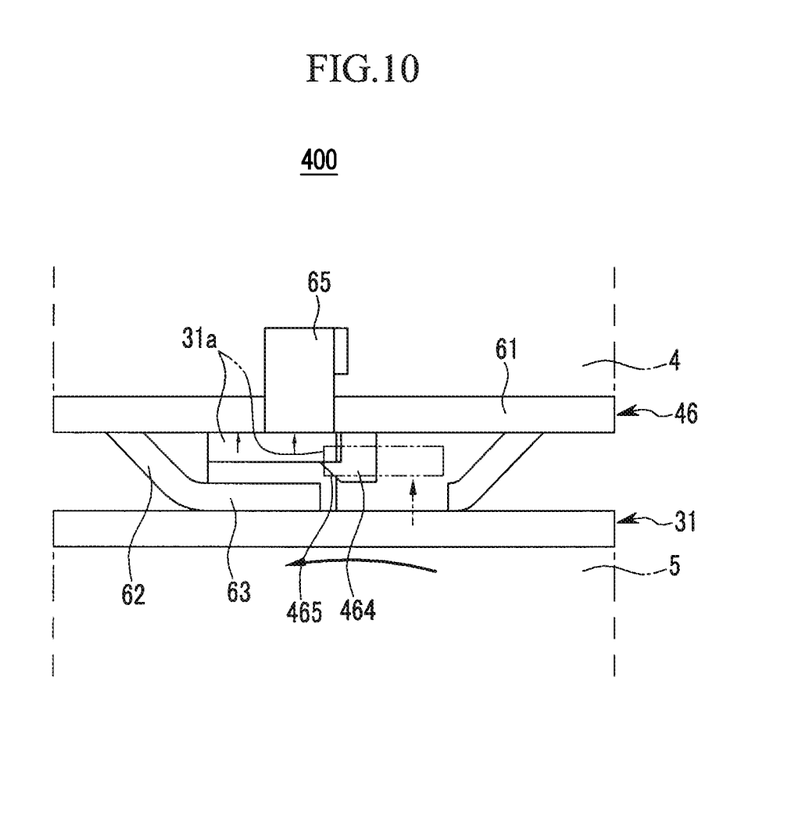
FIG. 10 is a top view of a connection tab and a cap plate of a rechargeable battery pack according to another exemplary embodiment of the present invention, shown in a coupled state.

FIG. 10 is a top view of a connection tab 46 and the cap plate 31 of a rechargeable battery pack 400 according to another exemplary embodiment of the present invention, shown in a coupled state. Whereas, in one embodiment, the connection tab 6 of the rechargeable battery pack 100 includes the stoppers 64 having a straight-line structure with respect to an axial direction, referring to FIG. 10, stoppers 464 of the connection tab 46 of the rechargeable battery pack 400 further include a protuberance 465 protruding in a circumferential direction.

The outside of the protuberance 465, in one embodiment, is formed as an inclined surface and the inside thereof is formed as a vertical plane so as not to inhibit axial insertion and so as to prevent or substantially prevent reverse rotation of the connection tab 46 relative to the cap plate 31. Therefore, in the connection tab 46, the stoppers 464 prevent or substantially prevent reverse rotation after the first protrusions 31a of the cap plate 31 are rotatably inserted, and, in addition, the protuberance 465 prevents or substantially prevents reverse pulling after the first protrusions 31a are axially inserted.

Figure 11:
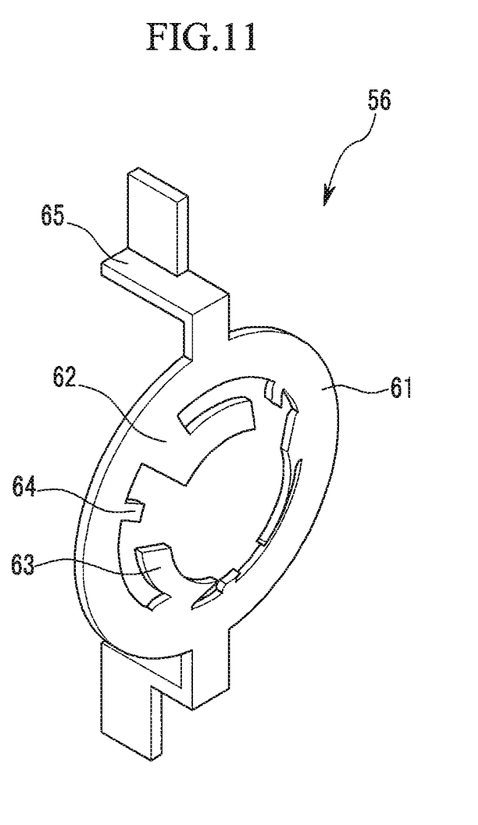
FIG. 11 is a perspective view of a connection tab of a rechargeable battery pack according to another exemplary embodiment of the present invention.

FIG. 11 is a perspective view of a connection tab 56 of a rechargeable battery pack according to another exemplary embodiment of the present invention. Whereas, in one embodiment, the connection tab 6 of the rechargeable battery pack 100 includes the pull tab 65 provided at one side of the flange 61, referring to FIG. 11, the connection tab 56 includes a pair of pull tabs 65 provided at two sides (e.g., opposite sides of the diameter direction) of the flange 61. As such, the rechargeable battery pack to which the connection tab 56 is applied may be connected to the protection circuit in various directions. In further embodiments, a connection tab of the present invention may include any other suitable number of pull tabs located at any suitable locations on the flange 61.

Figure 12:
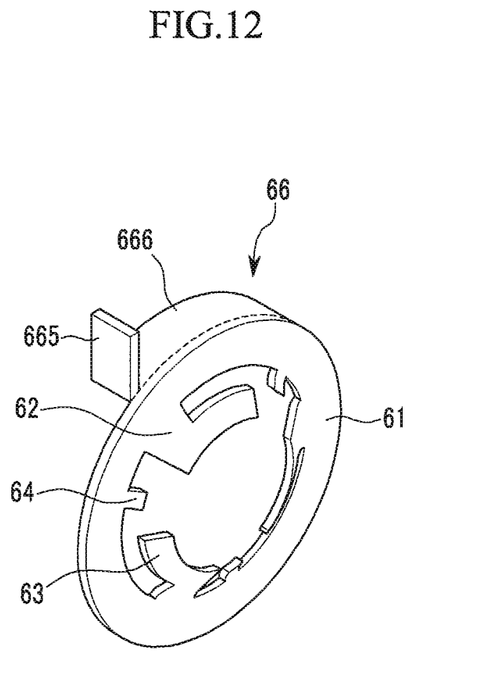
FIG. 12 is a perspective view of a connection tab of a rechargeable battery pack according to another exemplary embodiment of the present invention.

FIG. 12 is a perspective view of a connection tab 66 of a rechargeable battery according to another exemplary embodiment of the present invention. Whereas, in one embodiment, the connection tab 6 of the rechargeable battery pack 100 includes the pull tab 65 provided at one side of the flange 61, the connection tab 66 includes a pull tab 665 further including a rim 666 along the circumferential direction of the flange 61. As such, the connection tab 66 is contacted with the case 20 of the first unit cell 4 over a wider area, thereby forming a connection structure having a low resistance.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:
1. A rechargeable battery pack comprising:
 a first unit cell including a first end and a second end opposite the first end;
 a second unit cell including a first end and a second end opposite the first end, the second end having a plurality of openings, the second unit cell being coupled to the first unit cell in an axial direction extending between the first ends; and
 a connection tab coupled to the first end of the first unit cell and the second end of the second unit cell and electri- cally connecting the first and second unit cells to each other in series or parallel, the connection tab comprising:
a protrusion extending away from the first end of the first unit cell; and
a guide portion extending from a side of the protrusion in a circumferential direction relative to the axial direction, the guide portion being received in an opening of the plurality of openings,
wherein the guide portion has a length extending beyond the side of the protrusion in the circumferential direction.

2. The rechargeable battery pack of claim 1, wherein the connection tab is attached to a case of the first unit cell at the first end of the first unit cell.

3. A rechargeable battery pack comprising:
a first unit cell including a first end and a second end opposite the first end;
a second unit cell including a first end and a second end opposite the first end, the second unit cell being coupled to the first unit cell in an axial direction extending between the first ends; and
a connection tab coupled to the first end of the first unit cell and the second end of the second unit cell and electrically connecting the first and second unit cells to each other in series or parallel, the connection tab comprising:
a protrusion extending away from the first end of the first unit cell; and
a guide portion extending from the protrusion in a circumferential direction relative to the axial direction,
wherein the connection tab is attached to a case of the first unit cell at the first end of the first unit cell,
wherein the second unit cell comprises a cap plate including a protruded portion extending away from the second end of the second unit cell and an opening adjacent the protruded portion, and the guide portion is rotatably inserted in the opening in the circumferential direction, the guide portion being adjacent an inner surface of the protruded portion and constraining movement of the second unit cell relative to the first unit cell in the axial direction.

4. The rechargeable battery pack of claim 3, wherein the connection tab further comprises a flange and a stop protruding from the flange.

5. The rechargeable battery pack of claim 4, wherein the stop is adjacent the protruded portion of the cap plate of the second unit cell and constrains movement of the second unit cell relative to the first unit cell in the circumferential direction.

6. The rechargeable battery pack of claim 4, wherein the protrusion is a first protrusion, the guide portion is a first guide portion, and the connection tab further comprises a second protrusion extending away from the first end of the first unit cell and a second guide portion extending from the second protrusion in the circumferential direction, the first and second protrusions being spaced apart from one another in the circumferential direction, and the first and second guide portions being spaced apart from one another in the circumferential direction.

7. The rechargeable battery pack of claim 6, wherein the cap plate has another opening adjacent the protruded portion at a side of the protruded portion opposite the opening, and a distance between the first guide portion and the second protrusion in the circumferential direction is greater than a width of the protruded portion between the openings.

8. The rechargeable battery pack of claim 6, wherein the stop is between the first guide portion and the second protrusion in the circumferential direction and is elastically deformable by the protruded portion of the cap plate of the second unit cell.

9. The rechargeable battery pack of claim 8, Wherein the protruded portion is insertable between the first guide portion and the second protrusion.

10. The rechargeable battery pack of claim 4, wherein the connection tab further comprises an elastic member pushing the protruded portion of the cap plate of the second unit cell against the guide portion.

11. The rechargeable battery pack of claim 4, wherein the stop comprises a protuberance extending in a direction opposite the circumferential direction and covering a portion of the protruded portion of the cap plate of the second unit cell.

12. The rechargeable battery pack of claim 4, wherein the flange has a perimeter shape substantially corresponding to a perimeter shape of the case of the first unit cell at the first end of the first unit cell.

13. The rechargeable battery pack of claim 2, wherein the connection tab is welded to the case of the first unit cell at the first end of the first unit cell.

14. The rechargeable battery pack of claim 1, wherein the connection tab further comprises a flange coupled to the first end of the first unit cell, and the protrusion protrudes from the flange.

15. The rechargeable battery pack of claim 14, wherein the guide portion comprises an inclined surface facing the flange and being inclined away from the flange in the circumferential direction.

16. The rechargeable battery pack of claim 1, wherein the connection tab further comprises a tab protruding from a side of the connection tab and coupled to a protection circuit.

17. The rechargeable battery pack of claim 16, wherein the connection tab further comprises another tab protruding from another side of the connection tab.

18. The rechargeable battery pack of claim 16, wherein the tab comprises a rim portion extending around a perimeter portion of the first unit cell adjacent the first end of the first unit cell.

19. The rechargeable battery pack of claim 1, wherein the connection tab comprises at least one material selected from the group consisting of nickel, nickel alloys, stainless steel, zinc, zinc alloys, copper, copper alloys, silver, silver alloys, gold, gold alloys, platinum, platinum alloys, aluminum, aluminum alloys, molybdenum, molybdenum alloys, tungsten, tungsten alloys, titanium, titanium alloys, beryllium, beryllium alloys, rhodium, and rhodium alloys.

* * * * *